US012646162B2

(12) United States Patent
Leng et al.

(10) Patent No.: US 12,646,162 B2
(45) Date of Patent: Jun. 2, 2026

(54) DEFECT PREDICTION METHOD BASED ON MULTI-FEATURE PARALLEL MULTI-STAGE NEURAL NETWORK (MF-PMSNN)

(71) Applicant: GUANGDONG UNIVERSITY OF TECHNOLOGY, Guangzhou (CN)

(72) Inventors: Jiewu Leng, Guangzhou (CN); Junxing Xie, Guangzhou (CN); Keyou Zheng, Guangzhou (CN); Zisheng Lin, Guangzhou (CN); Yuanwei Zhong, Guangzhou (CN); Rongjie Li, Guangzhou (CN); Caiyu Xu, Guangzhou (CN); Kailin Xu, Guangzhou (CN); Qiang Liu, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 274 days.

(21) Appl. No.: 18/662,981

(22) Filed: May 13, 2024

(65) Prior Publication Data

US 2025/0265699 A1     Aug. 21, 2025

(30) Foreign Application Priority Data

Feb. 18, 2024     (CN) .......................... 202410180822.6

(51) Int. Cl.
*G06T 7/00*          (2017.01)
*G06V 10/44*         (2022.01)
(Continued)

(52) U.S. Cl.
CPC ............ *G06T 7/0008* (2013.01); *G06V 10/44* (2022.01); *G06V 10/764* (2022.01); *G06V 20/70* (2022.01);
(Continued)

(58) Field of Classification Search
CPC ......... G06T 7/0008; G06T 2207/10081; G06T 2207/20084; G06T 2207/30164;
(Continued)

(56) References Cited

U.S. PATENT DOCUMENTS 10,692,602 B1 * 6/2020 Nguyen ................. G16H 50/20
11,009,863 B2 * 5/2021 Bharadwaj ......... G05B 19/4099
(Continued)

OTHER PUBLICATIONS

Karthikeyan A, Balhara H, Hanchate A, Lianos AK, Bukkapatnam ST. In-situ surface porosity prediction in DED (directed energy deposition) printed SS316L parts using multimodal sensor fusion. arXiv e-prints. Apr. 2023:arXiv-2304 (Year: 2023).*

*Primary Examiner* — Xuemei G Chen

(57) ABSTRACT

A defect prediction method based on a multi-feature parallel multi-stage neural network (MF-PMSNN), includes: obtaining a trajectory dataset, and preprocessing data of a defect of a workpiece in additive manufacturing (AM); building an MF-PMSNN, and evaluating an output classification result based on evaluation indicators; and performing real-time defect prediction, and deploying a trained MF-PMSNN model to a production environment. The present disclosure combines and effectively matches thermal imaging-based in-situ monitoring data and X-ray computed tomography (XCT)-based in-situ monitoring data to ensure temporal and spatial consistency between the thermal imaging-based in-situ monitoring data and the XCT-based in-situ monitoring data. In this way, a molten pool status and a pore of the workpiece can be captured more comprehensively. The MF-PMSNN is proposed to obtain a molten pool status and the porosity distribution in the data and perform defect prediction.

9 Claims, 3 Drawing Sheets

Step 1 — Obtain a trajectory dataset, and preprocess data of a defect of a workpiece in AM Step 2 — Build an MF-PMSNN, where the MF-PMSNN has N branch networks, and each of the branch networks includes a Conv-Stem layer, a Stage X module, an average pooling layer, a fully connected layer, and a classifier that are sequentially connected, capture space and timing sequence information in multimodal data, and obtain a molten pool status and a porosity distribution characteristic in the data Step 3 — Evaluate an output classification result based on evaluation indicators Step 4 — Perform real-time defect prediction, and deploy a trained MF-PMSNN model to a production environment

(51) Int. Cl.

| | |
|---|---|
| *G06V 10/764* | (2022.01) |
| *G06V 20/70* | (2022.01) |

(52) U.S. Cl.

CPC ............... *G06T 2207/10081* (2013.01); *G06T 2207/20084* (2013.01); *G06T 2207/30164* (2013.01)

(58) Field of Classification Search

CPC ........ G06T 2207/20081; G06T 7/0004; G06V 10/44; G06V 10/764; G06V 20/70; Y02P 90/30; G06F 18/10; G06F 18/213; G06F 18/24; G06N 3/0499; G06N 3/09

See application file for complete search history.

(56) References Cited

U.S. PATENT DOCUMENTS

| | | | |
|---|---|---|---|
| 12,072,705 B2 * | 8/2024 | Chen ..................... G05D 1/689 |
| 2018/0004636 A1 | 1/2018 | Conti et al. |
| 2018/0024913 A1 | 1/2018 | Hassan |
| 2022/0382250 A1 * | 12/2022 | Frye ................... G01N 21/8851 |
| 2022/0407769 A1 * | 12/2022 | Thornton ............... G06N 3/045 |
| 2023/0329646 A1 * | 10/2023 | Zhou ..................... A61B 7/003 |
| 2023/0343078 A1 * | 10/2023 | Dey .......................... G06T 7/11 |
| 2023/0400833 A1 * | 12/2023 | Roychowdhury . G05B 19/4099 |
| 2023/0410412 A1 * | 12/2023 | Roychowdhury ..... B33Y 50/00 |
| 2024/0020217 A1 | 1/2024 | Kitagawa et al. |
| 2024/0024953 A1 * | 1/2024 | Buller .................... B22F 10/85 |
| 2024/0212857 A1 * | 6/2024 | Ouyang .................. G06N 3/08 |
| 2024/0221369 A1 * | 7/2024 | Vlasea .................. G06N 20/00 |
| 2024/0257557 A1 * | 8/2024 | Liu ...................... G06V 40/174 |
| 2024/0265542 A1 * | 8/2024 | Cheung ................. G16H 50/20 |
| 2024/0281642 A1 * | 8/2024 | Mendlovic .............. G06N 3/09 |
| 2024/0374189 A1 * | 11/2024 | Linguraru ........... A61B 5/7275 |
| 2024/0394538 A1 * | 11/2024 | Jiang ..................... G06T 7/0006 |
| 2025/0005942 A1 * | 1/2025 | Panetta ............. G06V 10/7715 |
| 2025/0025941 A1 * | 1/2025 | Liu ...................... G06T 7/0008 |
| 2025/0042092 A1 * | 2/2025 | Bailey ...................... G06T 7/11 |
| 2025/0078541 A1 * | 3/2025 | Sun ...................... G06V 10/776 |
| 2025/0218209 A1 * | 7/2025 | Sharma .................. G06T 17/00 |
| 2025/0318767 A1 * | 10/2025 | Yan ........................ G16H 50/20 |

* cited by examiner

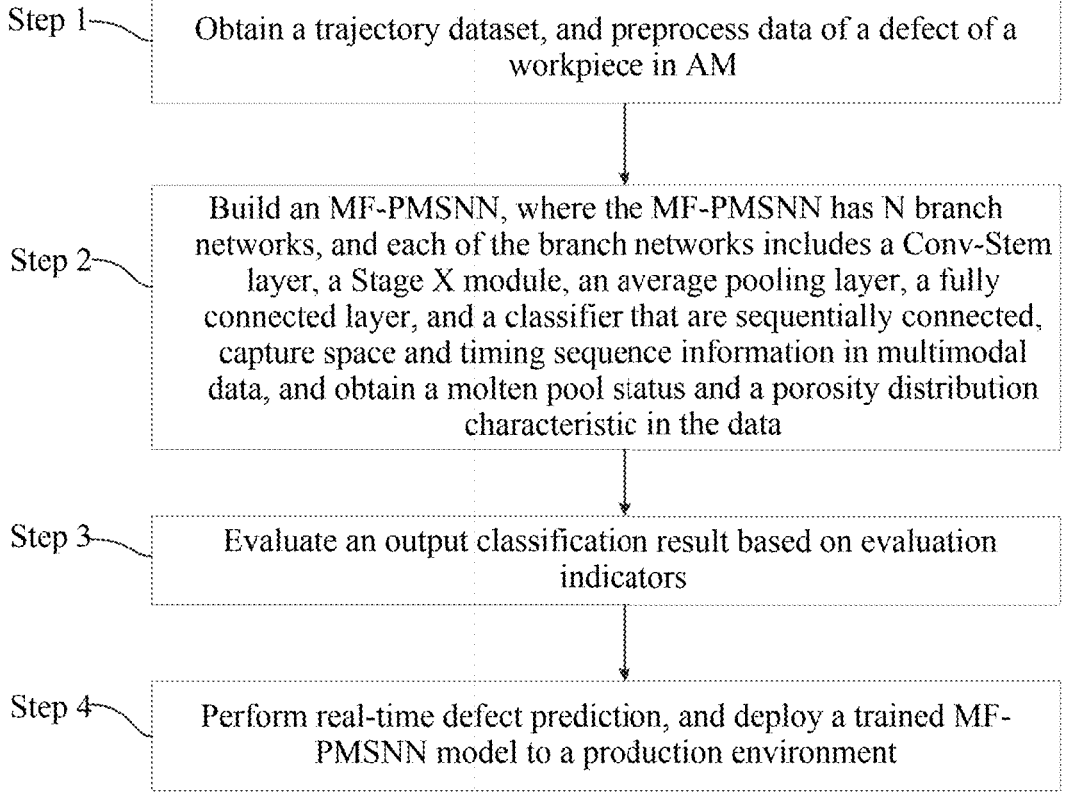

Step 1 — Obtain a trajectory dataset, and preprocess data of a defect of a workpiece in AM Step 2 — Build an MF-PMSNN, where the MF-PMSNN has N branch networks, and each of the branch networks includes a Conv-Stem layer, a Stage X module, an average pooling layer, a fully connected layer, and a classifier that are sequentially connected, capture space and timing sequence information in multimodal data, and obtain a molten pool status and a porosity distribution characteristic in the data Step 3 — Evaluate an output classification result based on evaluation indicators Step 4 — Perform real-time defect prediction, and deploy a trained MF-PMSNN model to a production environment

FIG. 1

DEFECT PREDICTION METHOD BASED ON MULTI-FEATURE PARALLEL MULTI-STAGE NEURAL NETWORK (MF-PMSNN)

CROSS-REFERENCE TO RELATED APPLICATIONS

This application claims priority to Chinese Patent Application No. 202410180822.6 with a filing date of Feb. 18, 2024. The content of the aforementioned application, including any intervening amendments thereto, is incorporated herein by reference.

TECHNICAL FIELD

The present disclosure relates to the technical field of learning prediction, and specifically, to a defect prediction method based on a multi-feature parallel multi-stage neural network (MF-PMSNN).

BACKGROUND

A deep learning framework for defect prediction in additive manufacturing (AM) based on thermal imaging-based in-situ monitoring measures surface radiance during laser exposure through short-wave infrared thermal imaging, and reconstructs a thermal history of a component. This framework consists of a data preprocessing workflow and a supervised deep learning classifier architecture. A custom convolutional neural network model is used for classification, training, and testing, and a trajectory dataset comes from the thermal imaging-based in-situ monitoring in manufacturing of a stainless steel test component. Research has shown that this framework has high accuracy in predicting porosity of a small-volume keyhole.

In the prior art, AM processing without using deep learning usually depends on a traditional image processing technique, and its detection is limited by prior knowledge and a manually designed feature. Traditional methods have poor adaptability to a complex process condition and a material change, making it difficult to deal with an environmental change in AM. These methods require a manually designed rule or feature extractor. Different from the deep learning, these methods cannot perform autonomous learning based on data, thus limiting a system in obtaining and applying new knowledge. Therefore, a traditional method lacking real-time feedback may not be able to give full play to its detection and prediction capabilities in a complex AM platform.

The AM involves complex fusion and pore formation, while a deep learning model can automatically learn and extract complex features such as a molten pool status and porosity without a need to manually design a feature extractor. With powerful capabilities for processing high-dimensional and large-scale data, the deep learning model can adapt to multimodal data in AM processing, including thermal imaging and X-ray computed tomography (XCT). A good deep learning model usually has a strong generalization capability and can accurately predict defects under a new process condition and material. Therefore, it is an effective method to use the deep learning for defect prediction in the AM processing.

The deep learning framework for the defect prediction based on the thermal imaging-based in-situ monitoring is an effective method in a current AM process. Although the thermal imaging-based in-situ monitoring is a most commonly used workpiece status monitoring method in the AM, the thermal imaging-based in-situ monitoring monitors only a condition of a surface layer, which may result in distorted deep learning prediction. In the AM, laser acts on metal powder of the surface layer, which may affect molten pool statuses and porosity of lower layers. Thermal imaging-based monitoring only covers the surface layer, and data is not comprehensive, resulting in inaccurate deep learning prediction. Therefore, it is necessary to combine the multimodal data and use the deep learning model to capture workpiece information more comprehensively, thereby improving accuracy of the defect prediction.

SUMMARY OF THE INVENTION

In view of the mentioned shortcomings in the prior art, the present disclosure provides a defect prediction method based on an MF-PMSNN.

In order to achieve the above effect, the present disclosure adopts the following technical solutions.

The present disclosure provides a defect prediction method based on an MF-PMSNN, including the following steps:

step 1, obtaining a trajectory dataset, and preprocessing data of a defect of a workpiece in AM;

step 2, building an MF-PMSNN, where the MF-PMSNN has N branch networks, and each of the branch networks includes a Conv-Stem layer, a Stage X module, an average pooling layer, a fully connected layer, and a classifier that are sequentially connected, capturing space and timing sequence information in multimodal data, and obtaining a molten pool status and a porosity distribution in the data, where specific steps are as follows:

step 2.1, inputting preprocessed data into the Conv-Stem layer for feature extraction to obtain an eigenvalue;

step 2.2, inputting the eigenvalue into the Stage X module for data processing, where the Stage X module includes a pooling layer and a local-to-global feature extraction module that are sequentially connected;

step 2.3, inputting the eigenvalue processed by the Stage X module into the average pooling layer for average pooling, and extracting a feature of the processed eigenvalue; and step 2.4, inputting the feature of the processed eigenvalue into the fully connected layer, constructing an output layer through the fully connected layer, using an activation function to map the feature inputted into the fully connected layer, and inputting mapped feature into the classifier for defect category recognition to obtain a defect category label;

step 3, evaluating an output classification result based on evaluation indicators; and step 4, performing real-time defect prediction, and deploying a trained MF-PMSNN model to actual production of the workpiece.

In one embodiment, the obtaining a trajectory dataset in the step 1 includes:

collecting trajectory data by using thermal imaging-based in-situ monitoring and XCT-based in-situ monitoring devices, wherein the trajectory data comprises thermal imaging-based in-situ monitoring data and XCT-based in-situ monitoring data;

defining a label related to the defect of the workpiece through supervised learning, wherein the label includes the molten pool status and a porosity distribution; and effectively matching the thermal imaging-based in-situ monitoring data and the XCT-based in-situ monitoring data to ensure temporal and spatial consistency between the thermal imaging-based in-situ monitoring data and the XCT-based in-situ monitoring data.

In one embodiment, the preprocessing the data of the defect of the workpiece in AM in the step 1 includes:

step 1.1, obtaining the trajectory dataset;

step 1.2, performing data cleaning to clean a missing value, an outlier, or an incorrect label in the trajectory dataset;

step 1.3, standardizing and normalizing the data;

step 1.4, labeling a defect in the trajectory dataset and a category to which each sample in the trajectory dataset belongs;

step 1.5, performing data enhancement on the trajectory dataset; and step 1.6, dividing the trajectory dataset into a training set, a validation set, and a test set.

In one embodiment, the trajectory dataset in the step 1.1 includes:

a model of a processing engine bed, ambient humidity, an ambient temperature, a molten pool length, a molten pool width, a molten pool eccentricity ratio, an average molten pool temperature, and a maximum molten pool temperature in the AM.

In one embodiment, the inputting the preprocessed data into the Conv-Stem layer for feature extraction in the step 2.1 includes:

performing 3×3 convolution with a stride of 2 on the processed data to halve a number of an output eigenvalue, performing batch normalization, and using an activation function Gaussian Error Linear Unit (GELU) in network training:

$$GELU(x) = 0.5x\left(1 + \tanh\left(\sqrt{\frac{2}{x}}\left(x + 0.044715x^3\right)\right)\right).$$

In one embodiment, the data processing in the step 2.2 includes pooling the eigenvalue by the Stage X module which specifically comprises:

pooling the eigenvalue outputted from the Conv-Stem layer, and capturing local information and global information of the eigenvalue, where the local-to-global feature extraction module includes a contextual perception block, a first batch normalization layer, a lightweight multi-head self-attention mechanism, a second batch normalization layer, and a multi-layer perceptron that are sequentially connected;

enhancing the eigenvalue by using the contextual perception block to obtain enhanced data, performing 3×3 depth-separable convolution on the enhanced data, and inputting obtained data into the first batch normalization layer, performing layer normalization and calculating a statistical magnitude for each input data sample by the first batch normalization layer, thereby facilitating convergence and stability of the model; and executing the lightweight multi-head self-attention mechanism to capture a long distance dependency in data inputted into the lightweight multi-head self-attention mechanism; and processing the long distance dependency by using the second batch normalization layer and the multi-layer perceptron, to obtain an output vector.

In one embodiment, the constructing the output layer through the fully connected layer in the step 2.4 includes:

connecting each input neuron of the fully connected layer to each output neuron to form a fully connected network, and converting the mapped feature into a final output, where an expression of the fully connected layer is as follows:

$$output = activation\ (input \times weights + biases)$$

where input represents the data inputted into the fully connected layer, weights represents a weight matrix, biases represents a bias, and activation represents the activation function.

The method further includes the following step after step 3: setting a loss function, using an Adam optimizer to optimize the MF-PMSNN, and obtaining an optimal MF-PMSNN when the loss function has a minimum value.

In one embodiment, the method further includes:

feedback and continuous improvement: collecting feedback information from a user and a professional on an evaluation result of the model after testing, adjusting the evaluation indicator, a model parameter, and a training method based on the feedback information, and regularly updating the trajectory dataset.

Compared with the prior art, the technical solutions of the present disclosure have the following beneficial effects:

The present disclosure combines and effectively matches thermal imaging-based in-situ monitoring data and XCT-based in-situ monitoring data to ensure temporal and spatial consistency between the thermal imaging-based in-situ monitoring data and the XCT-based in-situ monitoring data. In this way, a molten pool status and a pore of a workpiece can be captured more comprehensively. An MF-PMSNN is proposed to obtain a molten pool status and a porosity distribution in the data and perform defect prediction. The present disclosure solves a problem of distorted deep learning prediction caused by using only the thermal imaging-based in-situ monitoring data, making the defect prediction more accurate.

BRIEF DESCRIPTION OF THE DRAWINGS

FIG. 1 is a flowchart of a method according to the present disclosure;

DETAILED DESCRIPTION OF THE EMBODIMENTS

The implementations of the present disclosure are described below with reference to the accompanying drawings and preferred embodiments, and those skilled in the art can easily understand other advantages and effects of the present disclosure from the contents disclosed in this specification. The present disclosure can also be implemented or applied through other different specific implementations. Based on different viewpoints and applications, various modifications or amendments can be made to various details of this specification without departing from the spirit of the present disclosure. It should be understood that the following preferred embodiments are only used for illustrating the present disclosure, rather than limiting the protection scope of the present disclosure.

It should be noted that the drawings provided in the following embodiments merely illustrate the basic concepts of the present disclosure schematically. Therefore, the drawings only show components related to the present disclosure rather than being drawn according to quantities, shapes, and sizes of components in actual implementation, patterns, quantities, and proportions of components in actual implementation may be changed randomly, and a component layout may be more complex.

Before the embodiments of the present disclosure are described, relevant terms involved in the embodiments of the present disclosure are explained as follows:

MF-PMSNN: It is short for a multi-feature parallel multi-stage neural network.

AM: As a manufacturing technique, the AM constructs a three-dimensional object by stacking or adding a material layer by layer, and is opposed to a traditional manufacturing method in which a material is cut or removed.

Molten pool: The molten pool is a local melting region of metal powder due to laser irradiation, and is a start point of constructing a new layer.

Porosity: The porosity is a percentage of a pore or a bubble inside a component, which has a significant impact on strength and quality of the component.

F1-Score: F1-Score is an indicator for evaluating the overall function of the prediction model. It is a harmonic mean of the precision and the recall rate. F1-Score is especially suitable for applying in the cases with unbalanced dataset. A scope of F1-Score is [0, 1], and when F1-Score is about 1, it represents that the prediction model is well balanced between the precision and the recall rate and the prediction model is capable of recognizing the samples with defect effectively and error classification to the samples can be reduced significantly.

Embodiment

Figure 2:
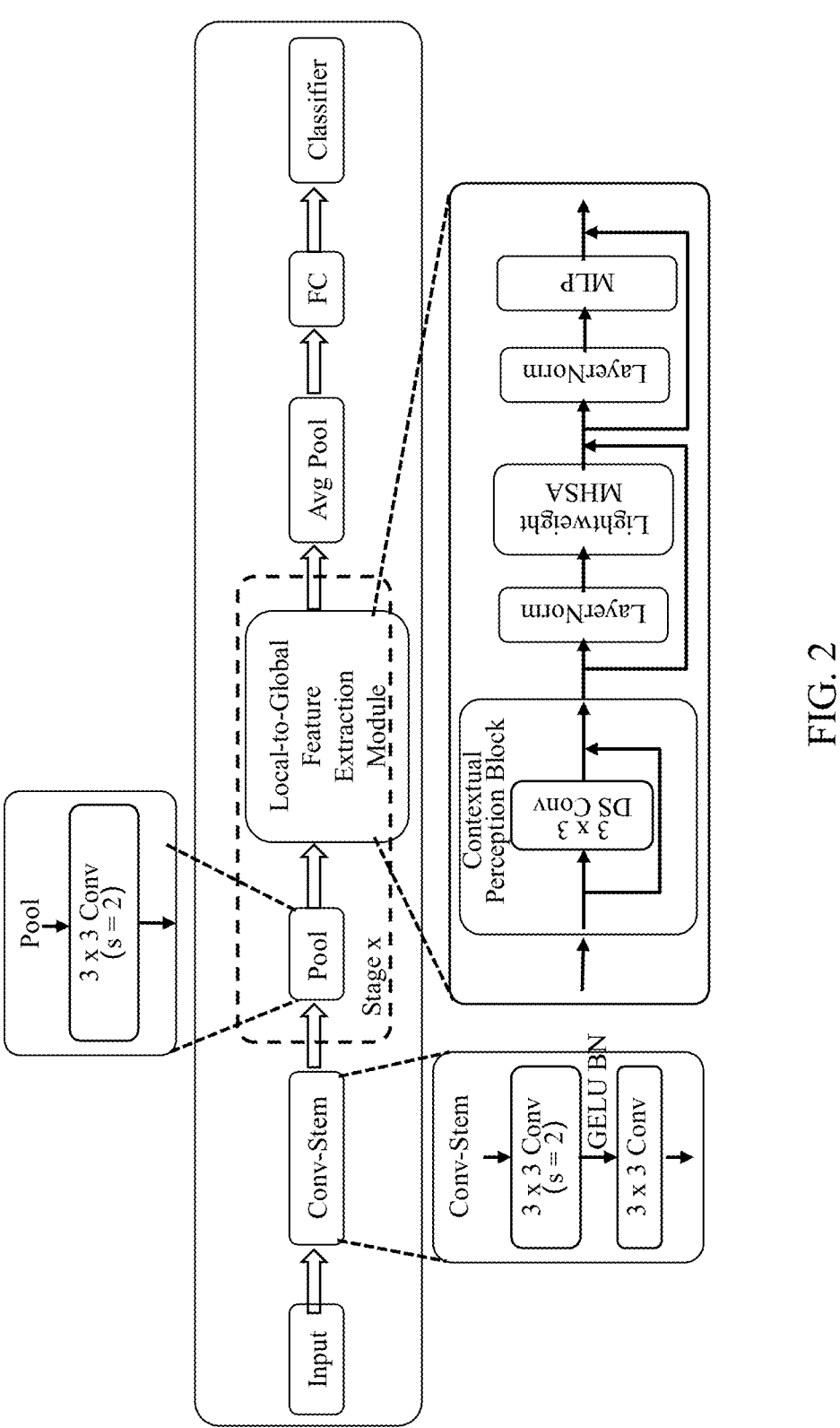
FIG. 2 is a schematic diagram of a branch of an MF-PMSNN according to the present disclosure.
Figure 3:
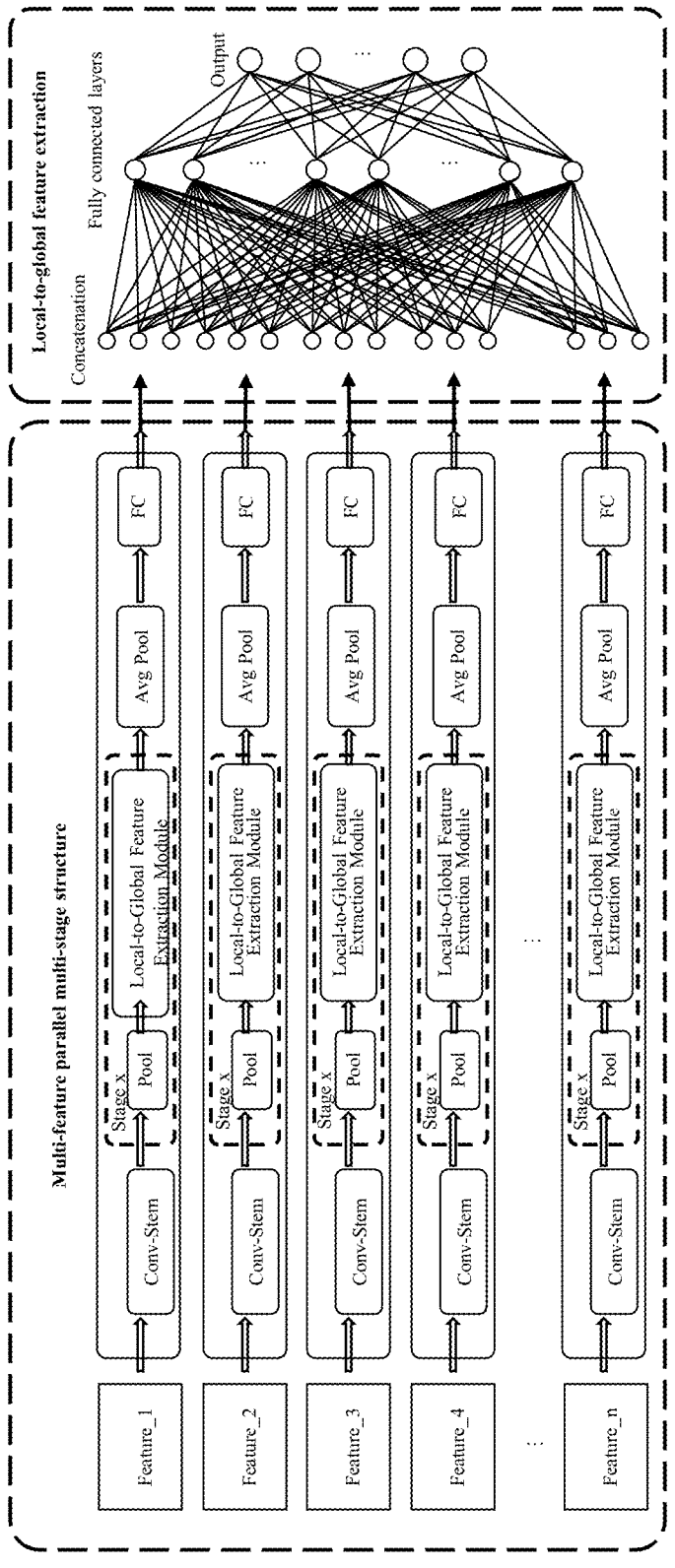
FIG. 3 is a schematic diagram of an MF-PMSNN according to the present disclosure.

This embodiment provides a defect prediction method based on an MF-PMSNN. Referring to FIG. 1 to FIG. 3, the following steps are included.

In step 1, a trajectory dataset is obtained, and data of a workpiece defect in AM is preprocessed.

In step 2, an MF-PMSNN is built. The MF-PMSNN has N branch networks, and each of the branch networks includes a Conv-Stem layer, a Stage X module, an average pooling layer, a fully connected layer, and a classifier that are sequentially connected. Space and timing sequence information in multimodal data is captured, and a molten pool status and a porosity distribution in the data are obtained. Specific steps are as follows:

In step 2.1, preprocessed data is input into the Conv-Stem layer for feature extraction to obtain an eigenvalue.

In step 2.2, the eigenvalue is input into the Stage X module for data processing. The Stage X module includes a pooling layer and a local-to-global feature extraction module that are sequentially connected.

In step 2.3, the eigenvalue processed by the Stage X module is input into the average pooling layer for average pooling, and a feature of the processed eigenvalue is extracted.

In step 2.4, the feature of the processed eigenvalue is input into the fully connected layer, and an output layer is constructed through the fully connected layer. An activation function is used to map the feature inputted into the fully connected layer, and mapped feature is input into the classifier for defect category recognition to obtain a defect category label. In other words, output data is mapped onto a predefined category through the classifier.

In step 3, an output classification result is evaluated based on evaluation indicators.

In step 4, real-time defect prediction is performed. A trained MF-PMSNN model is deployed to actual production of the workpiece to receive and process multimodal data in a timely manner, including thermal imaging data and XCT data.

The present disclosure recognizes key information such as the molten pool status and porosity of the workpiece in real time through model inference. An anomaly detection mechanism is introduced to effectively handle an output anomaly. Each real-time prediction result is recorded, and a production log is established to support subsequent analysis and optimization. This real-time defect prediction strategy helps to detect and handle a defect in AM processing in a timely manner, minimize a scrap rate, and improve production efficiency and product quality. Through continuous monitoring and feedback, the defect of the workpiece in the AM processing can be accurately predicted.

In the present disclosure, model training and optimization ensure that a format of a multimodal trajectory dataset matches an MF-PMSNN model. An appropriate loss function and optimizer are selected, and stability is improved through learning rate adjustment, batch normalization, regularization, and other techniques. This neural network model can train a plurality of features simultaneously and set independent parameters to train different features. After the training, the model can output training results in parallel. A training set is used to train the model, and a validation set is used to perform validation and handle overfitting or underfitting. With the help of a feedback mechanism, the model is adjusted and optimized based on the validation set and a feedback of an actual application, which may include adding training data and adjusting a model structure. A model weight is regularly saved, and accuracy of the neural network model in predicting defects under different process conditions is improved through a plurality of iterations, thereby enhancing generalization and application value. A loss function is selected, such as a mean square error or a cross entropy. The model is trained by using a backpropagation algorithm and the optimizer, and hyperparameter adjustment is performed on the validation set to optimize performance. The model is trained by using a registered trajectory dataset and optimized by using the feedback mechanism. This ensures a generalization capability of the model to different process conditions and materials, thereby improving accuracy and robustness of defect prediction.

As a preferred technical solution, in one embodiment, the obtaining the trajectory dataset in the step 1 includes following operations:

A format of the input data is matched with a design of the model. Trajectory data is collected by using thermal imaging-based in-situ monitoring and XCT-based in-situ monitoring devices, including thermal imaging-based in-situ monitoring data and XCT-based in-situ monitoring data. More comprehensive information of the workpiece is provided.

A label related to the defect of the workpiece is defined through supervised learning. The label includes the molten pool status and a porosity distribution.

The thermal imaging-based in-situ monitoring data and the XCT-based in-situ monitoring data are effectively matched to ensure temporal and spatial consistency between the thermal imaging-based in-situ monitoring data and the XCT-based in-situ monitoring data. This solves a problem of distorted deep learning prediction caused by only using surface layer information.

As a preferred technical solution, in this embodiment, the preprocessing data of a defect of a workpiece in AM in the step 1 includes the following steps:

In step 1.1, the trajectory dataset is obtained.

In step 1.2, data cleaning is performed to clean a missing value, an outlier, or an incorrect label in the trajectory dataset.

In step 1.3, the data is standardized and normalized.

In step 1.4, a defect in the trajectory dataset and a category to which each sample in the trajectory dataset belongs are labeled.

In step 1.5, data enhancement is performed on the trajectory dataset to generate more training samples.

In step 1.6, the trajectory dataset is divided into the training set, the validation set, and a test set, and complete input data is constructed.

Multimodal data fusion aims to integrate thermal imaging and XCT sensor data to obtain comprehensive information of the workpiece. A high-quality device is selected to ensure that its performance meets a real-time and high-resolution requirement. An optimal installation location is determined to enable the device to cover an entire processing region. Synchronous data collection is maintained, and a real-time transmission mechanism is established to support the defect prediction. The device is maintained and calibrated regularly to ensure performance and data accuracy. Data registration ensures the temporal and spatial consistency between the thermal imaging-based in-situ monitoring data and the XCT-based in-situ monitoring data. Specifically, a key feature point, a region, and a descriptor is extracted, and preliminary registration is performed by using a matching method. A timing sequence relationship between component shape change/deformation and data is considered to ensure continuity. A registration result is regularly evaluated to ensure accuracy and stability. A real-time feedback mechanism is established to monitor and adjust the registration to adapt to a production condition.

As a preferred technical solution, in this embodiment, the trajectory dataset in the step 1.1 includes:

a model of a processing engine bed, ambient humidity, an ambient temperature, a molten pool length, a molten pool width, a molten pool eccentricity ratio, a molten pool perimeter, an average molten pool temperature, a maximum molten pool temperature, time when a threshold 1200 K is exceeded, time when a threshold 1680 K is exceeded, and time when a threshold 2400 K is exceeded in the AM.

As a preferred technical solution, in this embodiment, the inputting the preprocessed data into the Conv-Stem layer for feature extraction in the step 2.1 includes the following operations:

3×3 convolution with a stride of 2 is performed on the preprocessed data to halve the number of the output eigenvalue, and batch normalization is performed. An activation function GELU is used in network training:

$$GELU(x) = 0.5x\left(1 + \tanh\left(\sqrt{\frac{2}{x}}\left(x + 0.044715x^3\right)\right)\right).$$

Network training is accelerated and robustness is improved. The 3×3 convolution is performed for further feature extraction and combination, which helps to extract and learn a higher-level feature representation.

In the present disclosure, in order to maintain spatial invariance, a space size remains unchanged during channel transformation, and the activation function GELU is used to perform nonlinear activation on a channel of a target image feature. This ensures randomness in a channel mapping process and makes training parameters of the neural network model in the present disclosure more robust.

As a preferred technical solution, in one embodiment, the data processing in the step 2.2 includes pooling the eigenvalue by the Stage X module which specifically the following operations:

The eigenvalue outputted from the Conv-Stem layer is pooled as the input data, and a plurality of convolution operations are performed during the pooling to enable the network to learn a more complex feature. Local information and global information of the input data are effectively captured in a modular structure that gradually extracts a global feature from a local feature. The local-to-global feature extraction module includes a contextual perception block, a first batch normalization layer, a lightweight multi-head self-attention mechanism, a second batch normalization layer, and a multi-layer perceptron that are sequentially connected.

The eigenvalue is enhanced by using the contextual perception block to obtain enhanced data, 3×3 depth-separable convolution is performed on the enhanced data, and obtained data is input into the first batch normalization layer to reduce a parameter quantity of a feature set at a specific level in a lightweight model. The first batch normalization layer performs layer normalization and calculates a statistical magnitude for each input data sample, facilitating convergence and stability of the model.

The lightweight multi-head self-attention mechanism is executed to capture a long distance dependency in the data inputted into the lightweight multi-head self-attention mechanism. the long distance dependency is processed by using the second batch normalization layer and the multi-layer perceptron, to obtain an output vector. A nonlinear modeling capability of a nonlinear mapping enhancement model is introduced. The entire network includes a plurality of modules to build a powerful end-to-end model. The multi-layer perceptron includes a plurality of fully connected layers. A multi-head attention mechanism is introduced to obtain more complete feature information and improve the generalization capability of the network.

As a preferred technical solution, in one embodiment, the constructing the output layer through the fully connected layer in the step 2.4 includes the following operations:

Each input neuron of the fully connected layer is connected to each output neuron to form a fully connected network, and the mapped feature is converted into a final output. An expression of the fully connected layer is as follows:

$$output = activation\ (input \times weights + biases).$$

In the above expression, input represents data inputted into the fully connected layer, weights represents a weight matrix, biases represents a bias, and activation represents the activation function. The activation function is used to introduce nonlinearity. The average pooling layer is used for pooling dimensionality reduction to extract a potential feature from the input data.

As a preferred technical solution, in one embodiment, the evaluating an experimental result based on evaluation indicators in the step 3 is as follows:

The evaluation indicators include Top-k accuracy, precision, a recall rate, and an F1-Score.

When k=1, a formula for the Top-k accuracy is as follows:

$$acc = \frac{TP + TN}{TP + TN + FP + FN}$$

A formula for the precision is as follows:

$$pre = \frac{TP}{(TP + FP)}$$

A formula for the recall rate is as follows:

$$recall = \frac{TP}{(TP + FN)}$$

A formula for the F1-Score is as follows:

$$F1 - \text{Score} = \frac{2 \times pre \times recall}{pre + recall} = \frac{2TP}{2TP + FP + FN}$$

where TP represents an actual number of samples with defect, TN represents an actual number of samples without defect, FP represents a predicted number of samples with defect, and FN represents a predicted number of samples without defect.

As a preferred technical solution, in this embodiment, after the step 3, the method further includes: setting the loss function, using an Adam optimizer to optimize the MF-PMSNN, and obtaining an optimal MF-PMSNN when the loss function has a minimum value. In this way, a generalization capability of the model is improved. The loss function is used to evaluate a degree to which a predicted value differs from a true value. The loss function may be a cross entropy loss or a mean square error loss.

As a preferred technical solution, in this embodiment, the method includes:

feedback and continuous improvement: collecting feedback information from a user and a professional on an evaluation result of the model after testing, adjusting the evaluation indicator, a model parameter, and a training method based on the feedback information, and regularly updating the trajectory dataset.

It should be noted that an internal structure of an object can be visualized according to an X-ray attenuation principle. The X-ray attenuation principle can provide basic information of a currently detected object for diagnosis and preservation. XCT is an advanced non-destructive testing technique that can visually display the detected object in a form of a two-dimensional or three-dimensional digital image without causing damage to the detected object. The XCT is based on a large number of different projections, which are then used to reconstruct a cross-sectional image (or slice) of the detected object. Each cross-sectional image is a digital image composed of a pixel matrix, and each pixel in the image represents a volume element (voxel) of an object. Based on the XCT technology, the embodiments of the present disclosure can be implemented with high precision, and the following beneficial effects are achieved:

In order to solve a problem that a thermal imaging-based in-situ monitoring method can only monitor a status of a surface layer, the present disclosure proposes an MF-PMSNN. This framework combines thermal imaging-based in-situ monitoring data and XCT-based in-situ monitoring data, and accurately registers these two types of trajectory datasets to more comprehensively capture a molten pool status and a pore of a workpiece. This solves a problem of distorted deep learning prediction caused by only using the thermal imaging-based in-situ monitoring data, making defect prediction more accurate.

Based on a deep learning framework for defect prediction, the present disclosure analyzes a lack of a real-time defect feedback and adjustment capability in an AM processing platform when the defect prediction is performed without using a deep learning method, as well as a problem of a single input trajectory dataset of the deep learning framework because only one type of thermal imaging sensor is used when the deep learning method is used for prediction. Combined with a deep learning method for defect prediction based on XCT-based in-situ monitoring, for a problem of an incomplete deep learning framework for the defect prediction due to insufficient layers of collected workpiece data, the present disclosure proposes a deep learning framework that uses a trajectory dataset obtained by accurately registering the thermal imaging-based in-situ monitoring data and XCT reference data as input data. This solves a problem of inaccurate defect prediction, and improves processing accuracy of the AM method. This method is improved on a basis of the thermal imaging-based in-situ monitoring to obtain an effective deep learning framework.

It is apparent that the above embodiments are merely intended to describe the present disclosure clearly, rather than to limit the implementations of the present disclosure. The person of ordinary skill in the art may make modifications or variations in other forms based on the above description. There are no need and no way to exhaust all the implementations. Any modification, equivalent substitution, and improvement made within the spirit and principle of the present disclosure should fall within the protection scope of the claims of the present disclosure.

What is claimed is:

1. A defect prediction method based on a multi-feature parallel multi-stage neural network (MF-PMSNN), comprising the following steps:

step 1, obtaining a trajectory dataset, and preprocessing data of a defect of a workpiece in additive manufacturing (AM);

step 2, building an MF-PMSNN, wherein the MF-PMSNN has N branch networks, and each of the branch networks comprises a Conv-Stem layer, a Stage X module, an average pooling layer, a fully connected layer, and a classifier that are sequentially connected, capturing space and timing sequence information in multimodal data, and obtaining a molten pool status and a porosity distribution in the data, wherein specific steps are as follows:

step 2.1, inputting preprocessed data into the Conv-Stem layer for feature extraction to obtain an eigenvalue;

step 2.2, inputting the eigenvalue into the Stage X module for data processing, wherein the Stage X module comprises a pooling layer and a local-to-global feature extraction module that are sequentially connected;

step 2.3, inputting the eigenvalue processed by the Stage X module into the average pooling layer for average pooling, and extracting a feature of the processed eigenvalue; and step 2.4, inputting the feature of the processed eigenvalue into the fully connected layer, constructing an output layer through the fully connected layer, using an activation function to map the feature inputted into the fully connected layer, and inputting mapped feature into the classifier for defect category recognition to obtain a defect category label;

step 3, evaluating an output classification result based on evaluation indicators; and step 4, performing real-time defect prediction, and deploying a trained MF-PMSNN model to actual production of the workpiece.

2. The defect prediction method according to claim 1, wherein the obtaining a trajectory dataset in the step 1 comprises:

collecting trajectory data by using thermal imaging-based in-situ monitoring and X-ray computed tomography (XCT)-based in-situ monitoring devices, wherein the trajectory data comprises thermal imaging-based in-situ monitoring data and XCT-based in-situ monitoring data;

defining a label related to the defect of the workpiece through supervised learning, wherein the label comprises the molten pool status and the porosity distribution; and effectively matching the thermal imaging-based in-situ monitoring data and the XCT-based in-situ monitoring data to ensure temporal and spatial consistency between the thermal imaging-based in-situ monitoring data and the XCT-based in-situ monitoring data.

3. The defect prediction method according to claim 2, wherein the preprocessing the data of the defect of the workpiece in AM in the step 1 comprises:

step 1.1, obtaining the trajectory dataset;

step 1.2, performing data cleaning to clean a missing value, an outlier, or an incorrect label in the trajectory dataset;

step 1.3, standardizing and normalizing the data;

step 1.4, labeling a defect in the trajectory dataset and a category to which each sample in the trajectory dataset belongs;

step 1.5, performing data enhancement on the trajectory dataset; and step 1.6, dividing the trajectory dataset into a training set, a validation set, and a test set.

4. The defect prediction method according to claim 3, wherein the trajectory dataset in the step 1.1 comprises:

a model of a processing engine bed, ambient humidity, an ambient temperature, a molten pool length, a molten pool width, a molten pool eccentricity ratio, an average molten pool temperature, and a maximum molten pool temperature in the AM.

5. The defect prediction method according to claim 1, wherein the inputting the preprocessed data into the Conv-Stem layer for feature extraction in the step 2.1 comprises:

performing 3×3 convolution with a stride of 2 on the preprocessed data to halve a number of an output eigenvalue, performing batch normalization, and using an activation function Gaussian Error Linear Unit (GELU) in network training:

$$GELU(x) = 0.5x\left(1 + \tanh\left(\sqrt{\frac{2}{x}}\left(x + 0.044715x^3\right)\right)\right).$$

6. The defect prediction method according to claim 5, wherein the data processing in the step 2.2 comprises pooling the eigenvalue by the Stage X module which specifically comprises:

pooling the eigenvalue outputted from the Conv-Stem layer, and capturing local information and global information of the eigenvalue, wherein the local-to-global feature extraction module comprises a contextual perception block, a first batch normalization layer, a lightweight multi-head self-attention mechanism, a second batch normalization layer, and a multi-layer perceptron that are sequentially connected;

enhancing the eigenvalue by using the contextual perception block to obtain enhanced data, performing 3×3 depth-separable convolution on the enhanced data, and inputting obtained data into the first batch normalization layer, performing layer normalization and calculating a statistical magnitude for each input data sample by the first batch normalization layer; and executing the lightweight multi-head self-attention mechanism to capture a long distance dependency in data inputted into the lightweight multi-head self-attention mechanism; and processing the long distance dependency by using the second batch normalization layer and the multi-layer perceptron, to obtain an output vector.

7. The defect prediction method according to claim 1, wherein the constructing the output layer through the fully connected layer in the step 2.4 comprises:

connecting each input neuron of the fully connected layer to each output neuron to form a fully connected network, and converting the mapped feature into a final output, wherein an expression of the fully connected layer is as follows:

$$output = activation\ (input \times weights + biases)$$

wherein input represents data inputted into the fully connected layer, weights represents a weight matrix, biases represents a bias, and activation represents the activation function.

8. The defect prediction method according to claim 1, after the step 3, further comprising: setting a loss function, using an Adam optimizer to optimize the MF-PMSNN, and obtaining an optimal MF-PMSNN when the loss function has a minimum value.

9. The defect prediction method according to claim 8, further comprising:

feedback and continuous improvement: collecting feedback information from a user and a professional on an evaluation result of the model after testing, adjusting the evaluation indicator, a model parameter, and a training method based on the feedback information, and regularly updating the trajectory dataset.

* * * * *